(12) United States Patent
Teodosiadis et al.

(10) Patent No.: US 6,859,202 B2
(45) Date of Patent: Feb. 22, 2005

(54) CONVERSION OF A HIERARCHICAL SUBDIVISION SURFACE TO NURBS

(75) Inventors: Steve Teodosiadis, Seattle, WA (US); Michael Lounsbery, Seattle, WA (US)

(73) Assignee: Alias Systems Corp., Toronto (CA)

( * ) Notice: Subject to any disclaimer, the term of this patent is extended or adjusted under 35 U.S.C. 154(b) by 134 days.

(21) Appl. No.: 10/127,702

(22) Filed: Apr. 23, 2002

(65) Prior Publication Data

US 2003/0197701 A1 Oct. 23, 2003

(51) Int. Cl.[7] .............................................. G06T 17/00
(52) U.S. Cl. ...................................................... 345/420
(58) Field of Search ................................ 345/420, 419, 345/421, 422, 423, 424

(56) References Cited

U.S. PATENT DOCUMENTS

| | | | | |
|---|---|---|---|---|
| 6,307,555 B1 | * | 10/2001 | Lee | 345/423 |
| 6,396,492 B1 | * | 5/2002 | Frisken et al. | 345/420 |
| 6,476,804 B1 | * | 11/2002 | Costabel | 345/419 |
| 6,587,105 B1 | * | 7/2003 | Stam | 345/423 |
| 6,628,280 B2 | * | 9/2003 | Perry et al. | 345/420 |
| 6,670,962 B2 | * | 12/2003 | Perry et al. | 345/619 |

OTHER PUBLICATIONS

Jorg Peters, "Patching Catmull–Clark Meshes." Computer Graphics Proceedings, Annual Conference Series. Jul. 23–28, 2000. pp. 255–258.

Tony DeRose et al., "Subdivision Surfaces in Character Animation" Computer Graphics Proceedings, Annual Conference Series. Jul. 19–24, 1998.

* cited by examiner

*Primary Examiner*—Don Wong
*Assistant Examiner*—Huedung X. Cao
(74) *Attorney, Agent, or Firm*—Staas & Halsey LLP

(57) ABSTRACT

A method of converting a subdivision surface to a NURBS representation. Adjacent faces of a subdivision surface are merged into a quadrilateral region, and vertices of the rectangular regions are used to generate a NURBS surface. The merging of faces reduces the number of vertices needed. Faces should not be merged if they do not comprise a quadrilateral region; if they cross an extraordinary point; if they cross a crease; or a face has already been merged. Imaginary vertices can be generated if not enough vertices are present for a face in the subdivision surface to create a corresponding NURBS patch for that face.

9 Claims, 10 Drawing Sheets

CONVERSION OF A HIERARCHICAL SUBDIVISION SURFACE TO NURBS

CROSS-REFERENCE TO RELATED APPLICATION(S)

BACKGROUND OF THE INVENTION

1. Field of the Invention

The present invention is directed to converting surfaces and objects represented by subdivision surfaces into a NURBS (Non-Uniform Rational B-Spline) representation. More particularly, the present invention provides a method, apparatus, and computer readable storage for implementing conversion algorithms, which convert data representing a subdivision surface into a NURBS representation. The NURBS representation can be displayed or stored in a standard data file readable by NURBS modeling applications.

2. Description of the Related Art

Subdivision surfaces are a known modeling tool used in computer graphics. A subdivision surface starts with a polygonal base mesh and continuously divides the base mesh according to subdivision rules until a tangent-plane continuous "smooth" surface results. Subdivision surfaces are increasing in popularity as a modeling tool, in part because these surfaces combine the benefits of both polygonal and NURBS modeling. Subdivision surfaces allow users to model smooth surfaces by manipulating a small set of control vertices.

NURBS representations are also a known modeling tool used in computer graphics. A NURBS surface is a representation of a polynomial surface that may be defined by a network of control points, optionally with their associated parameter spacings, known as knots. The surface may be constructed by blending the control points according to polynomial equations of UV parameters sampled in a rectangular or other regular region. In other words, a NURBS surface is comprised of a series of specially defined curves connected together to form a surface. The NURBS representation is advantageous in that precise circular arcs and other curves can be defined with infinite resolution.

A subset of NURBS surfaces are the uniform, non-rational B-splines of bi-cubic degree. A bi-cubic non-rational B-spline surface with uniform knot spacing may be converted into a subdivision surface (for example a Catmull-Clark subdivision surface) simply by mapping the B-spline control vertices into control vertices for the subdivision surfaces, and constructing connectivity information about which vertices and faces adjoin which others.

However, the prior art afforded no way to efficiently convert a subdivision surface to a NURBS surface.

SUMMARY OF THE INVENTION

It is an aspect of the present invention to provide a way to convert a subdivision surface to a NURBS representation.

It is another aspect of the present invention to convert a subdivision surface to a NURBS representation so that a storage size of the NURBS representation is reduced.

It is another aspect of the present invention that the resulting NURBS representation can represent most areas of the subdivision surface exactly, with the regions near the extraordinary points approximated within a tolerance.

The above aspects can be attained by a system that merges adjacent faces of a subdivision surface into a quadrilateral region; and collects vertices of the quadrilateral region. The vertices of a common region are used to create a NURBS surface.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The present invention can be described as a conversion method for converting a subdivision surface to a NURBS representation. After conversion, the NURBS representation can be stored as a standard file format readable by NURBS modeling software (i.e. an IGES file).

The article "Patching Catmull-Clark Meshes," by Jorg Peters, published July 2000 discusses how a single face of a subdivided surface can be converted into a NURBS representation. While four vertices define a face in the Peter's subdivided surface, sixteen vertices are needed from the subdivided surface to create that face in the NURBS world. The reason sixteen vertices are needed (as opposed to the four) is due to the basic nature of bi-cubic splines. Thus, to convert a single subdivided face to NURBS, the four vertices defining that face and twelve vertices surrounding that face (picture a 4×4 grid of 16 vertices) are needed.

Each individual face of a subdivided surface can be converted to a 16 vertex NURBS one by one using the Peters method. However, a subdivided surface typically grows at a rate of $N^4$ faces for each level. When a subdivided surface contains a very large number of faces, using the "one by one" technique can result in a very large file. The size of an IGES file storing a NURBS conversion of a subdivided sphere of many levels created by the above method can be so large as to be impractical. For example, a cube subdivided 5 times may have 6*4^5=more than 6000 separate NURBS patches to represent it. There are many other benefits of a more compact NURBS representation, including efficient evaluation, ray intersection, and bounding box methods, among others.

An improvement over the above-described method comprises merging regions (or faces) before converting to NURBS. This results in fewer NURBS regions to be converted and stored, hence quicker computation time and a smaller file. Further, the merging results in fewer NURBS curves and surfaces to work with, making it easier on the artist to work with the NURBS representation.

Figure 1:
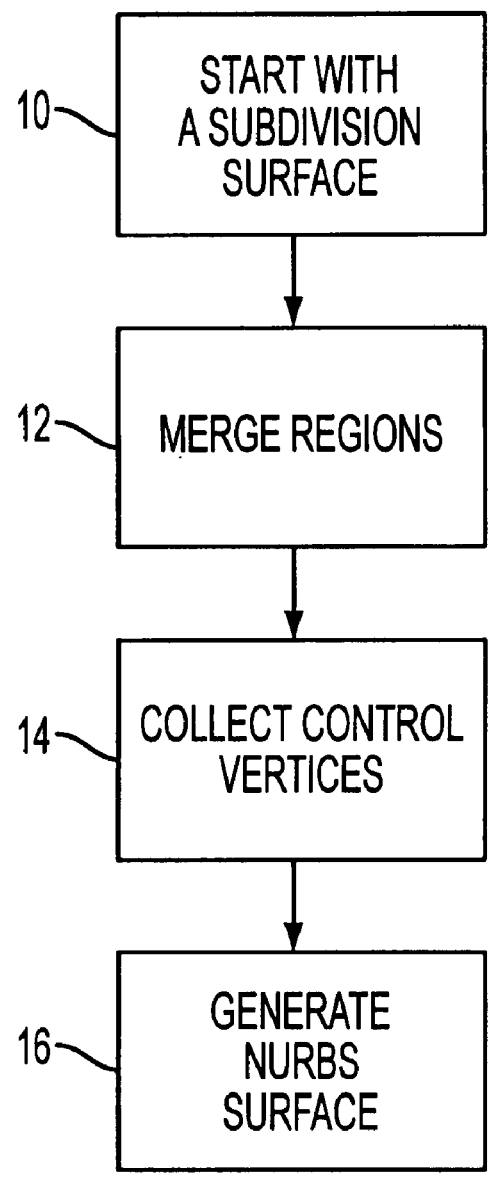
FIG. 1 is a flowchart illustrating a general method of the present invention, according to an embodiment of the present invention.

FIG. 1 is a flowchart illustrating a general method of the present invention, according to an embodiment of the present invention. Illustrated is a high level flowchart providing a general understanding of the method.

First, the method starts 10 with a subdivision surface. The subdivision surface can be generated by any conventional method. The method then merges 12 several regions of the subdivision surface. This merging operation increases the efficiency of the subsequent conversion to NURBS, and will be described below in more detail. After the merging operation, the method collects 14 the vertices of each of the regions merged. This collecting operation collects the required data for conversion, and will also be described below in more detail. After the vertices are collected, the method uses the vertices to generate 16 (or convert to) a NURBS surface. One method that can be used to generate the NURBS surface from the collected vertices is the method described in the Peters article. Optionally, instead of generating a NURBS surface, the vertices can be stored as a file.

Figure 2:
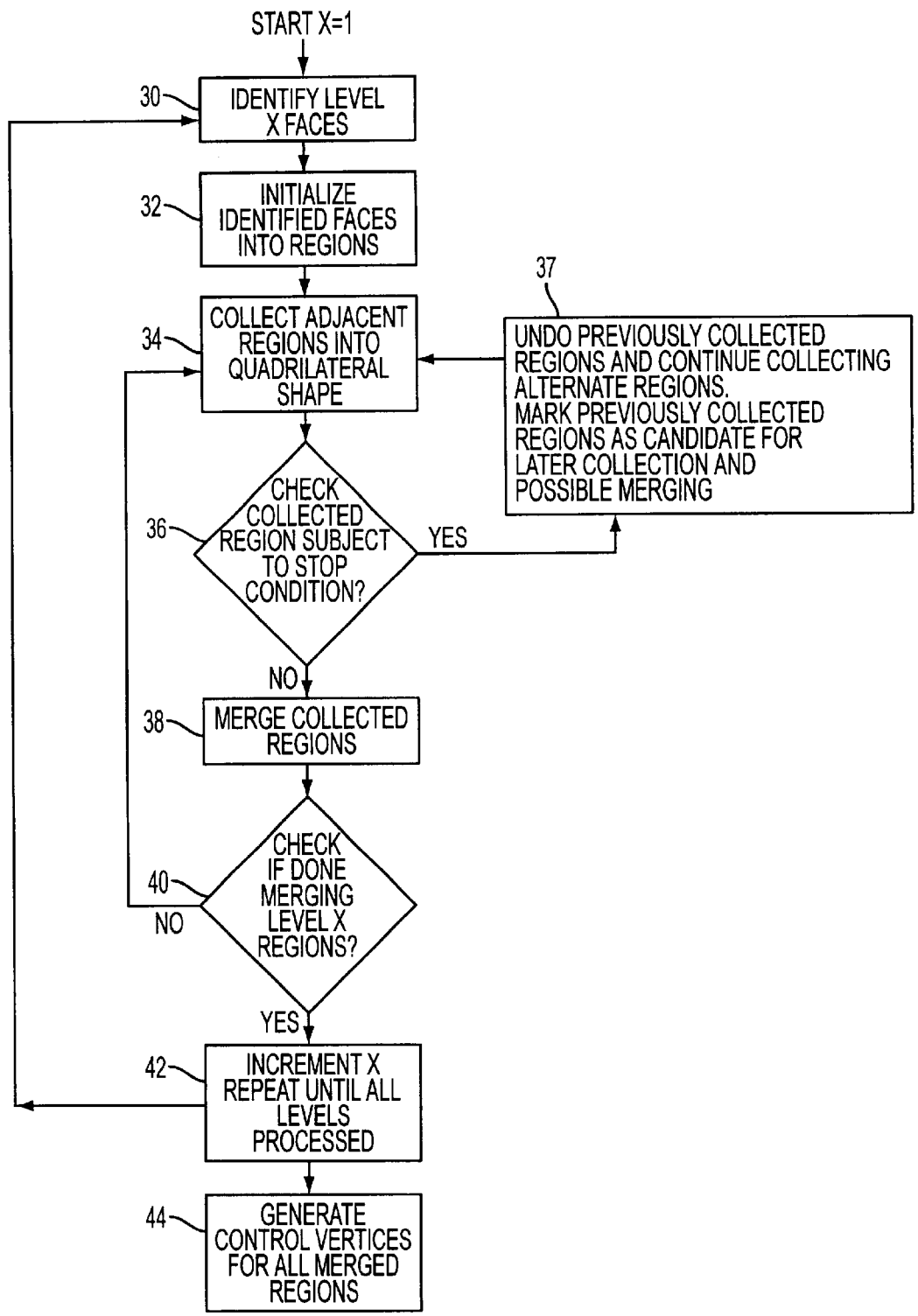
FIG. 2 is a flowchart illustrating the merging method in more detail, according to an embodiment of the present invention.

FIG. 2 is a flowchart illustrating the merging method in more detail, according to an embodiment of the present invention.

The merging operation starts by identifying 30 all level 1 faces. Each face can have a tag which indicates its level, and a list of faces is traversed and a list can be made of all level one faces. When a subdivided surface is created, the base mesh is divided (and possibly smoothed) a number of times; each time the resultant surface becomes smoother. At level 1, the base mesh is divided one time, at level 2 the level 1 surface is divided again, etc. Note that a subdivided surface may have different face levels. For example a hidden part of a surface may only be subdivided to level 1, while a prominent part of the surface may be divided to level 5 for more detail. This type of subdivision surface is commonly known in the art as a hierarchical subdivision surface. Thus, the merging operation operates level by level. In an alternative embodiment, it is possible to merge faces of different levels into a surface defined at a single level.

From the identifying 30 operation, the method then initializes 32 the identified faces into regions. This initialization may vary depending on the actual implementation of the merging operation. In one embodiment, the initializing can label each individual identified face as a unique region. Alternatively, each identified face can be tagged as an unmerged region.

From the initializing, the method then collects 34 adjacent regions into a quadrilateral shape. This can be done by storing these regions in a list or data structure. The algorithm will typically only collect quadrilateral shaped regions to be merged, as merging other shapes may not work as desired. Thus, a preset merging condition would be merging only quadrilateral regions. Alternative criteria for merging may be used as well. Adjacent regions can be collected in any known manner. One such method is starting with an arbitrary seed region and adjacent regions can be collected in a spiral direction using a greedy algorithm. More particularly, a greedy algorithm can be used using a breadth first search from a seed position. Until the collected regions comprise a quadrilateral shape, additional adjacent regions are collected. If a "dead end" is reached and no quadrilateral shape can be attained, the method then backs up and tries a different direction, consistent with a greedy algorithm. If it turns out the region cannot be expanded any further, i.e. a larger quadrilateral shape cannot be made, then this region is done trying to collect additional faces and the method can then continue with a different seed region.

Once a quadrilateral shape is collected in operation 34, then the method checks 36 to see if the region collected in operation 34 is subject to a stop condition. Certain regions should not be merged, as this would create an incorrect NURBS conversion. This is because it is difficult to exactly specify the vertices across an extraordinary point. Also, a NURBS surface requires an m×n set of vertices, rectangular in shape. If a collected region meets a "stop condition," then it is identified as an improper candidate for merging. The stop conditions will be explained below in more detail.

If the method checks 36 and determines that a stop condition has been met, then the regions that were previously tested will not be merged. The regions collected in the immediately prior step will be undone 37. Instead, the additional regions can be tagged as a seed for later collection. The method then returns to operation 34 and the previous region can continue the greedy algorithm looking for alternative regions that will make a quadrilateral shape.

If the method checks 36 and determines that a stop condition has not been met, then the method merges 38 the collected regions. The merging can be accomplished by any conventional region merging technique, such as labeling all of the regions to be merged with a same unique label.

After the merging operation, the method checks 40 if it is done merging all level x regions. This can be done by making sure that the collecting algorithm in operation 34 has tried all possible alternatives for all regions in the level x. If the collecting is not done, then the method returns to operation 34, which continues to collect alternate adjacent regions into a quadrilateral shape. The collection operation can resume collecting for the previous merged region to make it larger, or if that region has finished processing a new seed can be used.

If the method checks 40 if it is done merging all level x regions and returns that it is done, then x is incremented. If there are faces at level x, then the method proceeds to operation 30 which identifies level x faces.

When all levels are processed, the method generates 44 vertices for all merged regions. Note that the area around extraordinary points cannot be exactly converted, so instead of simply copying them over, as is done with other vertices, they are approximated. This is done by choosing a vertex at a corner such that position and tangent conditions for the patches meeting there are satisfied. This operation loops through all of the merged regions and outputs the vertices for each region.

The vertices can then be used as exact NURBS control vertices to create NURBS patches, or the vertices can be stored in a file.

Vertices at corners with extraordinary points should be adjusted to the subdivision limit point. At extraordinary points, the subdivision surface is non-polynomial, and in general there is no layout of vertices that leads to an exact NURBS representation of the subdivision surface. Instead, we compute an approximation to the subdivision surface by carefully choosing vertices that will match well. We choose to set the vertices at the corner such that the NURBS approximation at that corner matches the input subdivision surface both in position and in tangent plane. This can be done by solving a least squares system for the vertices, subject to position and derivative constraints.

The method of FIG. 2 can be programmed to include automatic error checking using conventional methods, so that endless loops and other computational issues associated with intensive iterative algorithms can be avoided.

Figure 3:
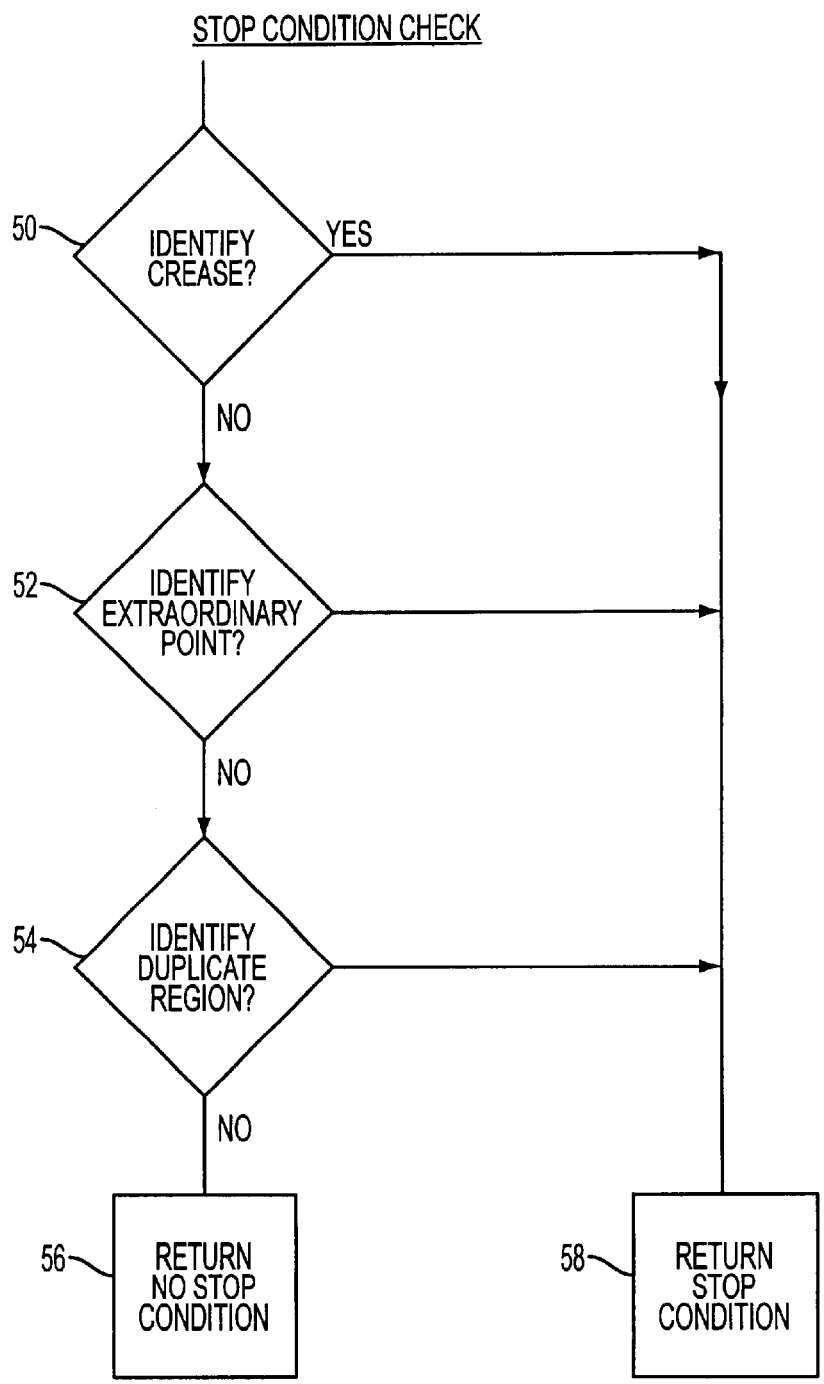
FIG. 3 is a flowchart illustrating the stop condition check, according to an embodiment of the present invention.

FIG. 3 is a flowchart illustrating the stop condition check, according to an embodiment of the present invention. The stop condition check is performed in operation 36 of FIG. 2 and is performed on collected regions, which are candidates for merging. As discussed above, the stop condition check identifies regions that would produce erroneous results if merged.

First, a check is performed to identify 50 whether the collected adjacent regions cross a crease. A crease is identified as a tangent continuous break, where the tangent plane on one side of a point is different from the tangent plane on the other side, such as occurs along the edge of a cube. A subdivision surface data structure can label each edge as creased or not. If a crease is identified, then the stop condition check returns 58 a stop condition.

If a crease is not identified, then the stop condition check proceeds to identify 52 an extraordinary point(s). An extraordinary point is a point that connects to other than four edges. A point that connects to four edges is said to be "valence 4" and is not an extraordinary point. A point that connects to five edges is said to be "valence 5" and is considered an extraordinary point. A point that connects three edges is considered to be an extraordinary point of "valence 3," and so on for points that connect to a number of edges different than 4. If an extraordinary point is identified, and the collected adjacent regions would be merged across or over the extraordinary point (the extraordinary point falls on a common side of the regions to be merged) then the stop condition check returns 58 a stop condition. However, if the extraordinary point is on the perimeter of the regions, but is not on a side that is merging, then the merging can still take place and the stop condition check does not return a stop condition.

If an extraordinary point is not identified, then the stop condition check proceeds to identify 54 whether the face is a duplicate face. A duplicate face is a face that has already been merged. Due to the nature of the merging algorithm, it is very possible for a region that has already been merged to be identified as another candidate for merging. A tag can be used to identify which regions have already been merged. If a duplicate region is identified, then the stop condition check returns 58 a stop condition.

If all of the tests 50, 52 and 54 fail, then the stop condition check returns 56 no stop condition. As such, the merging algorithm should typically merge the adjacent regions, as the merging will not present a problem when the merged region is later converted to NURBS.

Figure 4A:
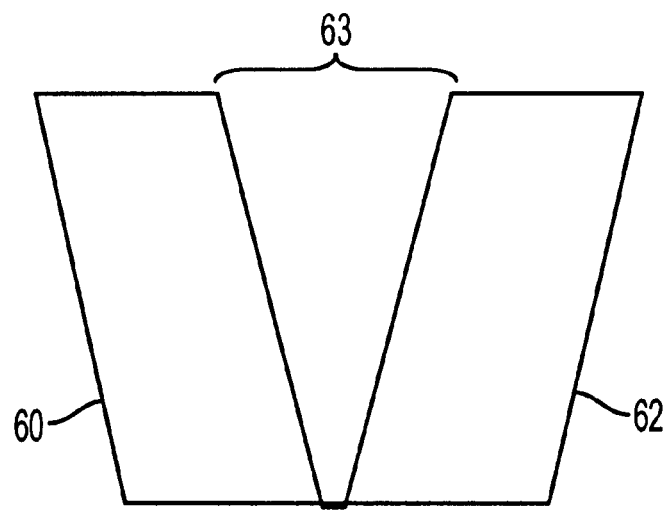
FIGS. 4A and 4B are drawings illustrating examples of creases.
Figure 4B:
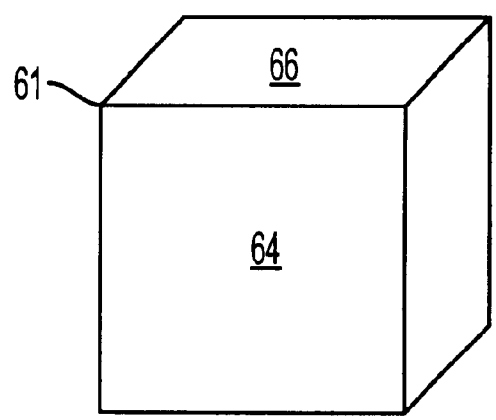

FIGS. 4A and 4B illustrate examples of creases. FIG. 4A illustrates a crease 63 (in this case a gap) between face 60 and face 62. FIG. 4B illustrates a crease 67 between face 64 and face 66. In this case, because of the angle between face 60 and face 62, these faces cannot be merged. Typically if the angle between faces is greater than half a degree, they cannot be merged, although this cutoff point can be preset to any value by the user, or it may be computed at finer levels from crease information at coarser levels. Also, in an embodiment of the present invention, creases may not be detected automatically but instead a user may have to choose and set them.

Figure 5A:
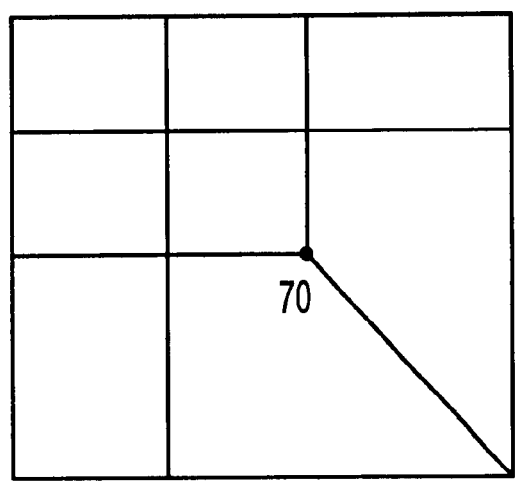
FIGS. 5A and 5B are drawings illustrating examples of extraordinary points.
Figure 5B:
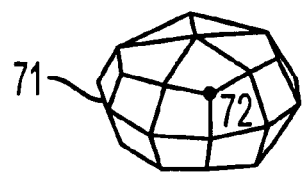

FIGS. 5A and 5B illustrate examples of extraordinary points. FIG. 5A illustrates an extraordinary point 70 of valence 3. FIG. 5B illustrates a sphere 71 with an extraordinary point 72 of valence 3.

Figure 6:
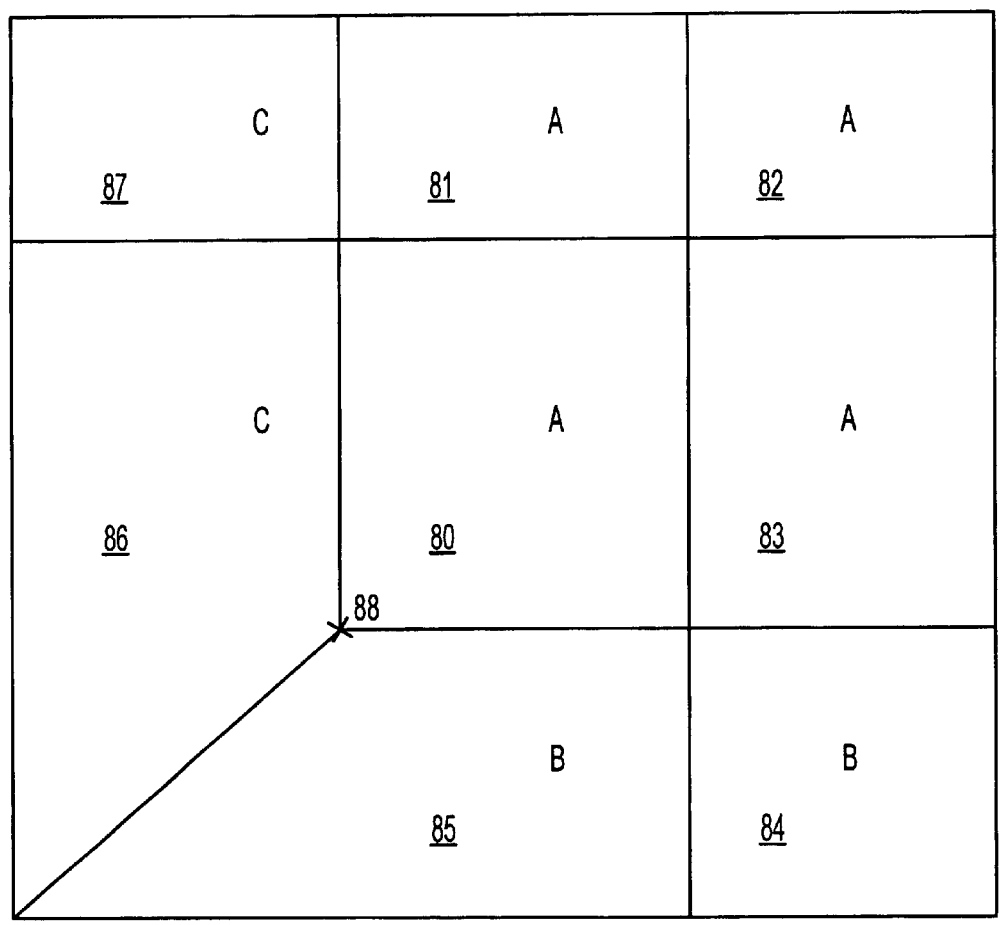
FIG. 6 is a drawing illustrating faces and how they can be merged, according to an embodiment of the present invention.

FIG. 6 is a drawing illustrating faces and how they can be merged, according to an embodiment of the present invention. Eight faces are illustrated—80, 81, 82, 83, 84, 85, 86, and 87. There is also an extraordinary point 88. We will perform an example and show how these 8 faces are merged.

An arbitrary face can be chosen for a seed, in this case we will choose face 80. The merging algorithm spirals up to face 81. Face 80 and 81 comprise a quadrilateral region, therefore the algorithm will attempt to merge these two faces. Since there is no stop condition, faces 80 and 81 can be successfully merged. Note that while extraordinary point 88 is in the corner of face 80, this does not create a stop condition since the extraordinary point 88 is not between the regions being merged. Thus, we merge faces 80 and 81 and label them as region 'A.'

From face 81 the algorithm spirals to the right to face 82. Since faces 80, 81 and 82 do not form a quadrilateral region, the algorithm spirals down to face 83. Since faces 80, 81 (already merged) and 82 and 83 form a rectangular region, the algorithm will attempt to merge these regions. Since there is no stop condition, region A (faces 80 and 81) and faces 82 and 83 are merged. Faces 82 and 83 are now also labeled as region 'A.'

From face 83 the algorithm spirals down to face 84. Since region 'A' and face 84 do not form a quadrilateral region, the algorithm spirals left to face 85. Faces 84 and 85 also do not form a quadrilateral region with region 'A.' Face 86 also does not comprise a quadrilateral shape with faces 85 and 84 and region 'A.' Face 87 can be collected with faces 86, 85 and 84 and an attempt can be made to merge these faces with region 'A' (because these faces and region 'A' form a quadrilateral). However, this merger is subject to a stop condition because the extraordinary point 88 would be crossed (or "surrounded").

Thus, the region comprising faces 84 and 85 are then collected as a quadrilateral shape and merged with each other because no stop condition exists. Note that extraordinary point 88 is not being merged over. Therefore, faces 84 and 85 are merged and labeled as a separate region 'B.'

From face 85, the algorithm proceeds to face 86. Since as stated above, face 86 cannot be collected as a quadrilateral shape with the remaining regions ('A' and 'B'), the algorithm proceeds from face 86 to face 87. As stated above, faces 86 and 87 can be collected with the remaining faces as a quadrilateral shape, but this would be subject to a stop condition because of extraordinary point 88. Thus, faces 86 and 87 are collected to form a quadrilateral region, and since no stop condition exists, they are merged. Therefore, faces 86 and 87 are merged and labeled as region 'C.'

Please note that the above is just one example of how an algorithm can accomplish the merging. The above merging could have been performed in a different order, additional determinations could have been made, and an entirely different result could have been achieved. It can be appreciated by one of ordinary skill in the art that different types of algorithms can be used (greedy, ad hoc., etc.) and different methods can be used to implement the merging (recursion, looping, etc.)

Figure 7A:
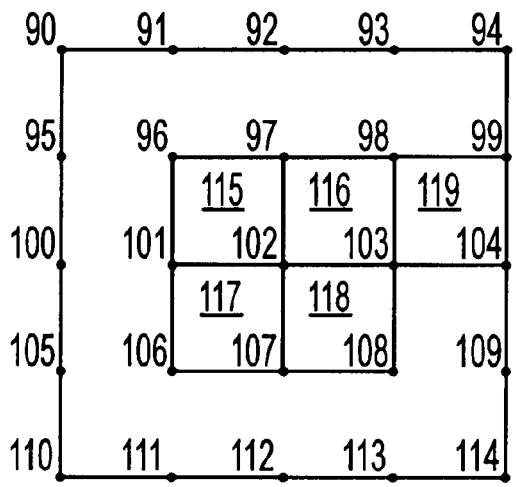
FIG. 7A is a drawing illustrating faces and their vertices, according to an embodiment of the present invention.

FIG. 7A is a drawing illustrating faces and their vertices, according to an embodiment of the present invention. Vertices 90–114 and faces 115,116, 117,118 are illustrated. As stated above and in the Peters article, 16 vertices are needed to convert a face into a corresponding NURBS patch. Thus, vertices 90–93, 95–98, 100–103 and 105–108 are needed to create a NURBS patch for face 115. Vertices 91–94, 96–99, 101–103. and 106–108 are needed to create NURBS patch for face 116. Vertices 95–98,100–103, 105–108. and 110–113 are needed to create a NURBS patch for face 117. Vertices 96–99, 101–104, 106–109, and 111–114 are needed to create a NURBS patch for face 118.

Note that a region comprising only face 115 requires 16 vertices to convert to a NURBS patch. A region comprising merged faces 115 and 116 requires 20 vertices (each face requires 16 vertices, so16+16=32, however 12 of these vertices are common to both faces and no duplication is needed). A region comprising merged faces 115, 116, 117, and 118 requires 25 vertices 90–114. Note that if the conversion to NURBS were done face by face, 64 vertices would be needed instead of 25. Thus, the size of any output file created by this method will be much smaller.

While face 119 needs 16 vertices for conversion to NURBS, only 12 of the needed vertices are present. Therefore, we need to create "imaginary" vertices.

Figure 7B:
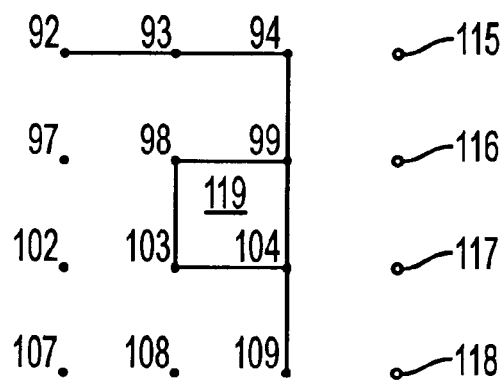
FIG. 7B is a drawing illustrating the drawing of imaginary vertices, according to an embodiment of the present invention.

FIG. 7B is a drawing illustrating the drawing of imaginary vertices, according to an embodiment of the present invention. Since face 119 needs 4 additional vertices for a NURBS conversion, imaginary vertices 115 116 117 and 118 are calculated. Imaginary vertices are vertices not present in the original surface but calculated or generated so that the proper number of vertices can be collected to convert to a NURBS patch. Imaginary vertices can be calculated by using the standard subdivision rules.

All of the respective vertices for needed faces (or regions) are collected. The collected vertices can be stored to a file (such as an IGES file format) that is readable by a NURBS editor. The collected vertices can also be used to immediately generate a NURBS surface.

Figure 8:
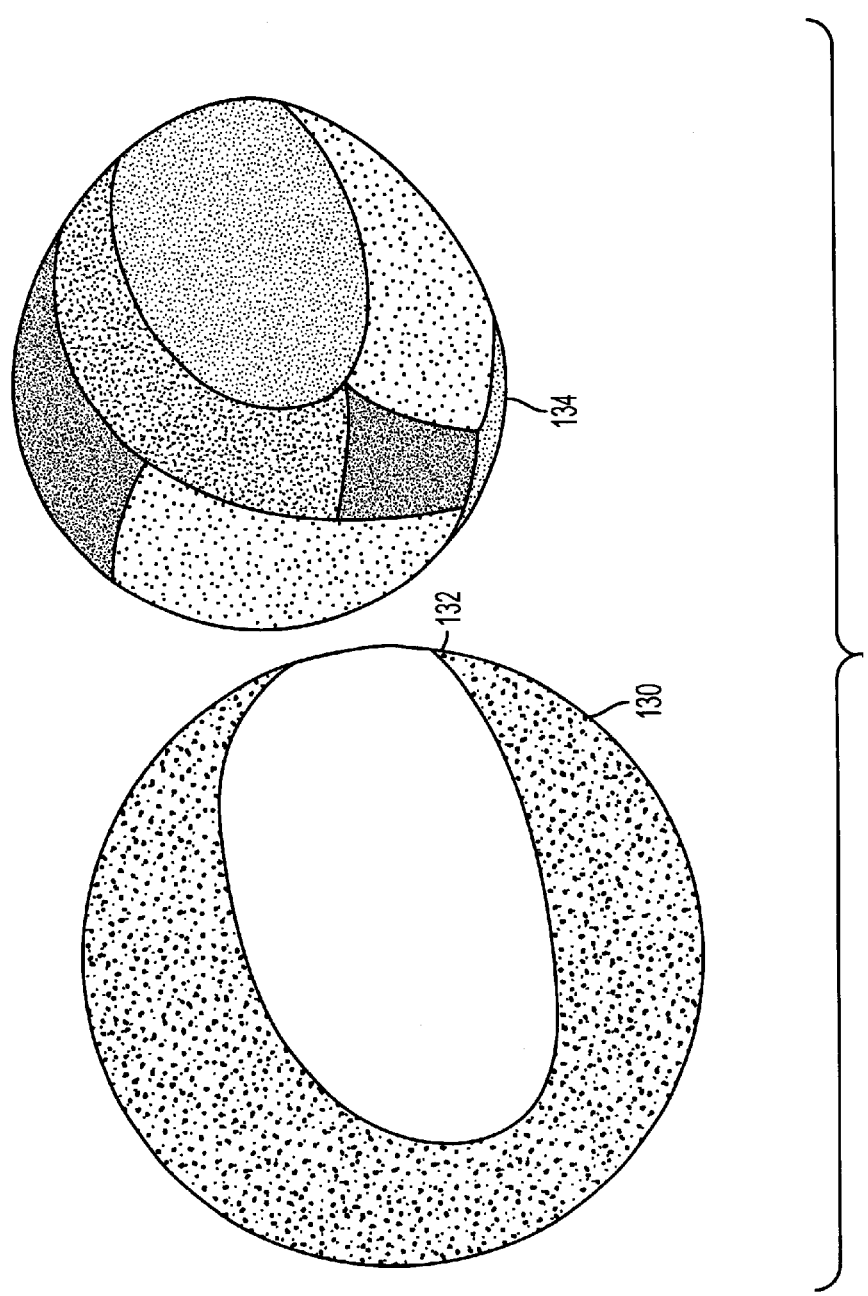
FIG. 8 is a screen shot illustrating a subdivision surface sphere and its conversion to NURBS, according to an embodiment of the present invention.

FIG. 8 is a screen shot illustrating a subdivision surface sphere and its conversion to NURBS, according to an embodiment of the present invention.

Subdivision sphere 130 is a sphere generated by subdivision surfaces. Crease area 132 is a crease in the subdivision sphere 130. After conversion by the method of the present invention, NURBS sphere 134 is generated. Note the NURBS sphere 134 has different shades of gray indicating the different merged regions. Also note that the coloring of different merged regions can be different depending on parameters chosen (choice of seed, etc.) and the present invention is not limited to merging regions as illustrated in the NURBS sphere 134.

In another embodiment of the present invention, all faces with extraordinary points can be tagged, and one of these faces can be selected as the seed face when collecting faces. When the seed region has grown to as big as it can get, another seed is chosen from the tagged faces. This is likely to result in fewer larger regions and faster processing time. In another embodiment of the present invention, the user could specify the seed regions, or even the regions themselves.

Figure 9:
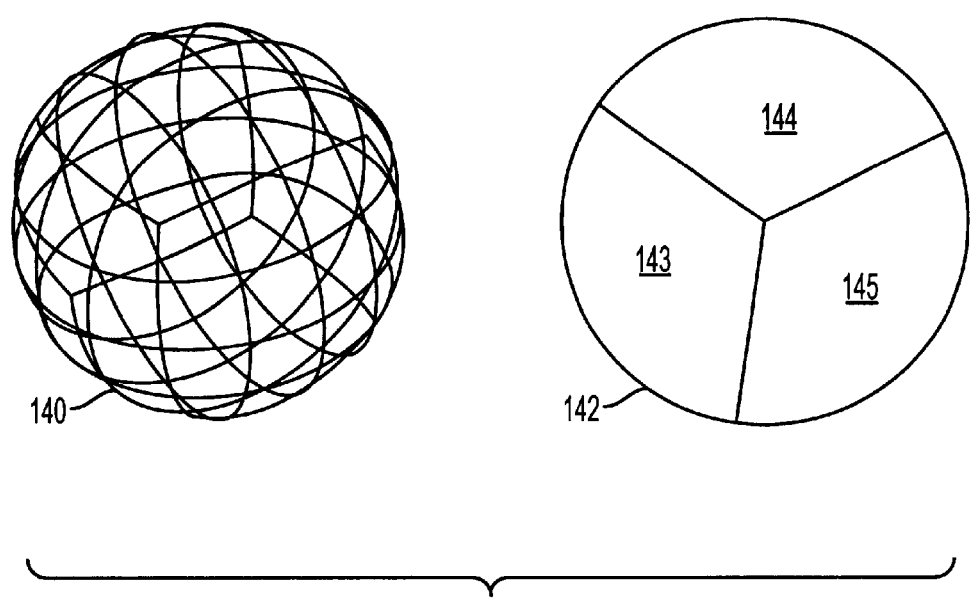
FIG. 9 is another screen shot illustrating a subdivision surface sphere and its conversion to NURBS, according to an embodiment of the present invention.

FIG. 9 is another screen shot illustrating a subdivision surface sphere and its conversion to NURBS, according to an embodiment of the present invention.

The subdivision sphere 140 is a subdivision surface generated by subdividing a cube base mesh using subdivision rules. Note that the faces of the subdivision sphere are curved (and not polygons) because even though the control mesh has straight, flat segments, the underlying surface may be curved depending on the evaluation rules. The NURBS sphere 142 is created by applying the method of the present invention to subdivision sphere 140. Note that the NURBS sphere 142 has three regions 143, 144, and 145. Note that the NURBS sphere 142 actually has six regions, but three are hidden from view.

Note that the description of the present invention so far has applied to converting polygons representing from subdivision surfaces into a representation of a NURBS surface. In another embodiment of the present invention, the above-described methods can be used to convert any polygonal representation computed using subdivision rules into NURBS, even if the vertices of the polygon are not intended to specify an actual subdivision surface. Also, in another embodiment of the present invention, a polygonal surface generated by any method can be converted into a NURBS representation. Note that in these other embodiments, the imaginary vertices are computed in the same way as previously described. The polygon vertices are equivalent to control vertices on the subdivision surface that would exist if we evaluated these polygon vertices as subdivision control vertices instead.

Figure 10:
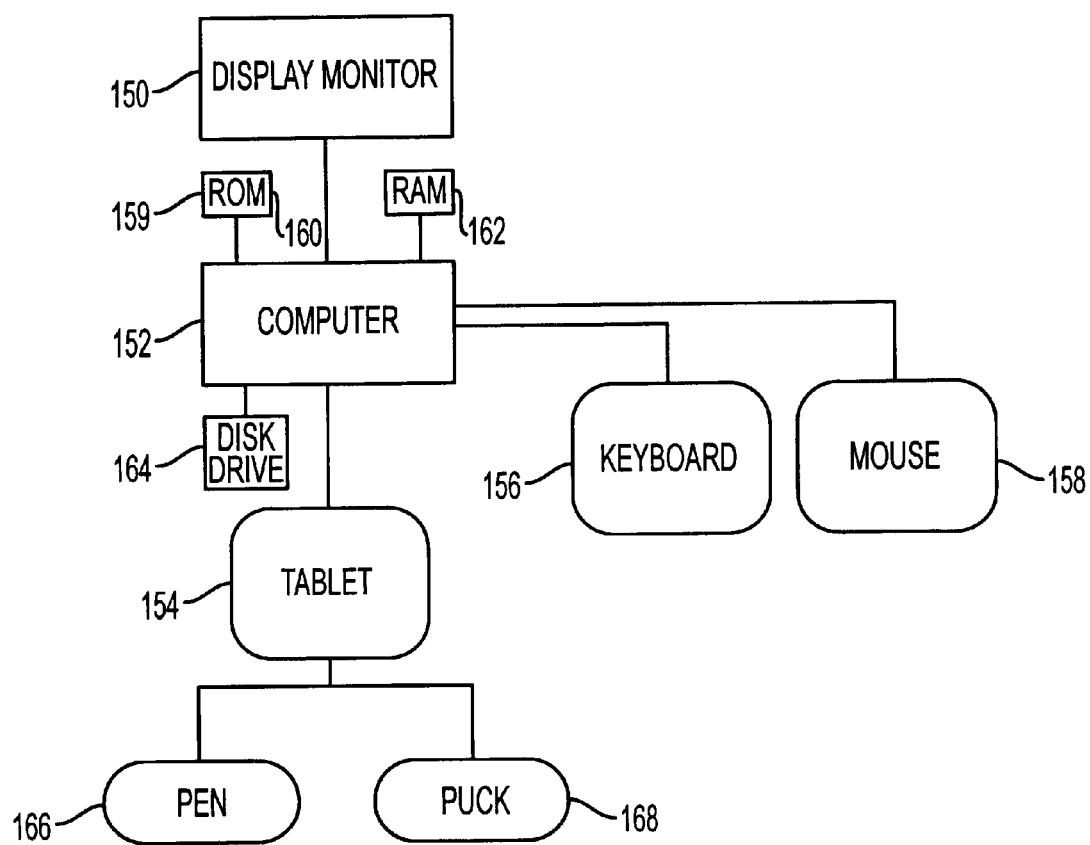
FIG. 10 is a block diagram illustrating one example of a configuration of hardware used to implement the present invention, according to an embodiment of the present invention.

FIG. 10 is a block diagram illustrating one example of a configuration of hardware used to implement the present invention, according to an embodiment of the present invention.

A display monitor 150 is connected to a computer 152. The computer performs the operational processes described herein based upon input from a keyboard 156 and/or a mouse 158. A drawing tablet 154 can also be connected to the computer 152. The computer 152 has connected a ROM 159, a RAM 162, and a disk drive 164. In addition, a drawing pen 166 and/or a puck 168 can also be used as input devices for the tablet 154. Of course, any applicable configuration of hardware can be used to implement the present invention.

The system can also include any type of conventional peripherals, including permanent or removable storage, such as magnetic and optical discs, etc. Further, any storage used with the computer (disk drive, RAM, etc.) can store the process and data structures of the present invention. The processes can also be distributed via, for example, downloading over a network such as the Internet.

The present invention has been described with respect to an efficient conversion method for converting a subdivision surface to a NURBS representation.

The article entitled "Patching Catmull-Clark Meshes," by Jorg Peters, SIGGRAPH 2000, is incorporated by reference herein. Also incorporated by reference is the article entitled, "Subdivision surfaces in character animation," by Tony DeRose, Michael Kass, and Tien Truong, Proceedings of SIGGRAPH 98, pp. 85–94, July 1998

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of converting a subdivision surface to NURBS, comprising:

merging adjacent faces of the subdivision surface into a quadrilateral region; and collecting vertices of the quadrilateral region, and wherein the stop condition comprises merging over an extraordinary point.

2. A method of converting a subdivision surface to NURBS, comprising:

merging adjacent faces of the subdivision surface into a quadrilateral region; and collecting vertices of the quadrilateral region, and wherein the merging does not merge adjacent faces into a quadrilateral region when the merging would be subject to a stop condition, and wherein the stop condition comprises merging over a crease.

3. A method of converting a subdivision surface to NURBS, comprising:

merging adjacent faces of the subdivision surface into a quadrilateral region; and collecting vertices of the quadrilateral region, and wherein the merging does not merge adjacent faces into a quadrilateral region when the merging would be subject to a stop condition, and wherein the stop condition comprises merging a duplicate face.

4. A method of converting a subdivision surface to NURBS, comprising:

merging adjacent faces of the subdivision surface into quadrilateral region; and collecting vertices of the quadrilateral region, and wherein the merging selects adjacent faces by using a spiral pattern.

5. A method of converting a subdivision surface to NURBS, comprising:

merging adjacent faces into a quadrilateral region, the adjacent faces are selected using a spiral pattern, the merging does not merge adjacent faces into a quadrilateral region when the merging would be subject to a stop condition, the stop condition comprising crossing an extraordinary point, crossing a crease, and crossing a duplicate face;

repeating the merging until all faces are merged or unable to merge;

collecting vertices of the merged regions;

generating imaginary vertices when needed;

after performing the merging and collecting for all level 1 faces, performing the merging, repeating, collecting and generating for each subsequent face level;

storing the vertices into a file format readable by a NURBS application; and creating a NURBS surface from the vertices.

6. A method of converting a polygonal surface to NURBS, comprising:

merging adjacent faces of the polygonal surface into a quadrilateral region; and collecting vertices of the quadrilateral region, wherein the merging does not merge adjacent faces into a quadrilateral region when the merging would be subject to a stop condition, and wherein the stop condition comprises merging over an extraordinary point.

7. A method of converting a polygonal surface to NURBS, comprising:

merging adjacent faces of the polygonal surface into a quadrilateral region; and collecting vertices of the quadrilateral region, wherein the merging does not merge adjacent faces into a quadrilateral region when the merging would be subject to a stop condition, and wherein the stop condition comprises merging over a crease.

8. A method of converting a polygonal surface to NURBS, comprising:

merging adjacent faces of the polygonal surface into a quadrilateral region; and collecting vertices of the quadrilateral region, wherein the merging does not merge adjacent faces into a quadrilateral region when the merging would be subject to a stop condition, and wherein the stop condition comprises merging a duplicate face.

9. A method A method of converting a polygonal surface to NURBS, comprising:

merging adjacent faces of the polygonal surface into a quadrilateral region; and collecting vertices of the quadrilateral region, and wherein the merging selects adjacent faces by using a spiral pattern.

* * * * *

UNITED STATES PATENT AND TRADEMARK OFFICE
CERTIFICATE OF CORRECTION

PATENT NO. : 6,859,202 B2
DATED : February 22, 2005
INVENTOR(S) : Steve Teodosiadis It is certified that error appears in the above-identified patent and that said Letters Patent is hereby corrected as shown below:

Column 7,
Lines 13-14, change "." to -- , --.
Line 34, insert -- , -- after "115" and "116".

Column 9,
Line 36, before "quadrilateral" insert -- a --.

Column 10,
Line 44, delete the first occurrence of "A method".

Signed and Sealed this

Twenty-first Day of February, 2006

JON W. DUDAS
*Director of the United States Patent and Trademark Office*